Figure 1:
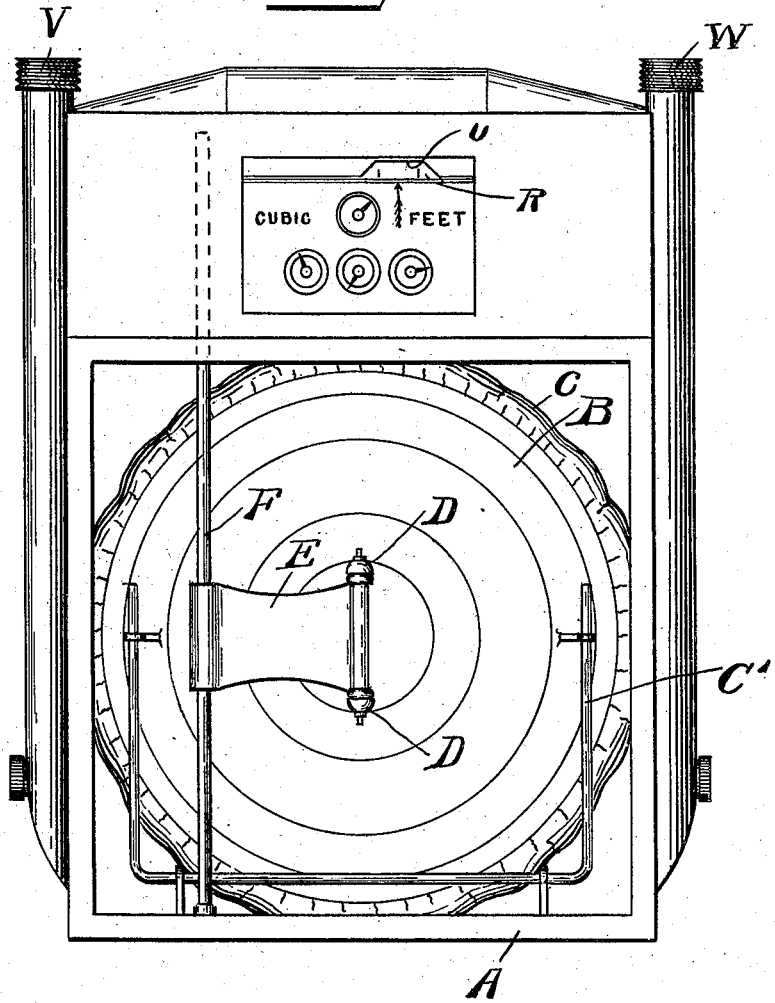

R. L. DEZENDORF.
GAS METER.
APPLICATION FILED MAY 20, 1908.

924,437.

Patented June 8, 1909.
2 SHEETS—SHEET 1.

Witnesses:

Inventor
R. L. DEZENDORF
By his Attorneys

R. L. DEZENDORF.
GAS METER.
APPLICATION FILED MAY 20, 1908.
924,437.
Patented June 8, 1909.
2 SHEETS—SHEET 2.
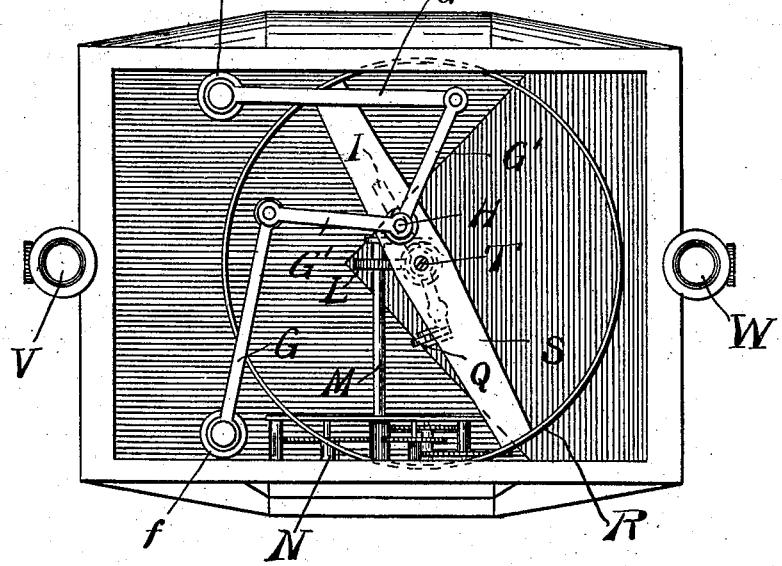
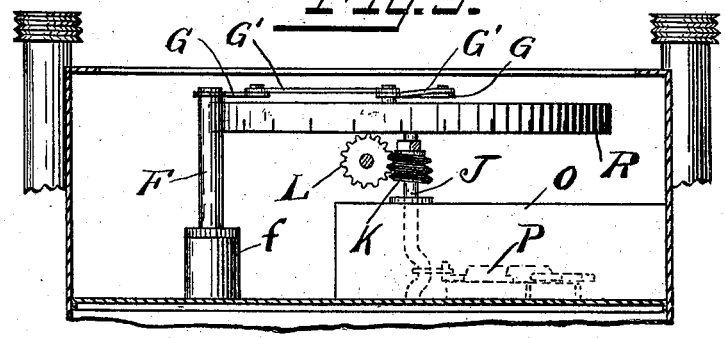
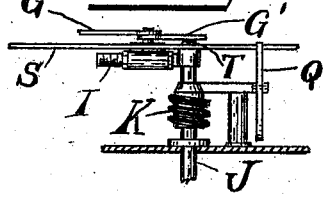
Witnesses:
Inventor
R. L. Dezendorf
By his Attorneys

UNITED STATES PATENT OFFICE.

RICHARD L. DEZENDORF, OF RICHMOND HILL, NEW YORK.

GAS-METER.

No. 924,437.      Specification of Letters Patent.      Patented June 8, 1909.

Application filed May 20, 1908. Serial No. 433,862.

*To all whom it may concern:*

Be it known that I, RICHARD L. DEZENDORF, a citizen of the United States, residing at Richmond Hill, county of Queens, State of New York, have invented certain new and useful Improvements in Gas-Meters, of which the following is a full, clear, and exact description.

My invention relates to improvements in gas meters, and has for its object to provide means for quickly indicating whether or not there is any gas passing through the meter, even though the amount may be very small. It is particularly useful in detecting the leakage of gas, which, in the meters now used, can only be detected after a considerable period. Thus, when a meter is installed, the requirements are that the person installing it shall not leave it until he is sure that all the connections are tight, so that there is no leakage. If there is a small leakage, it may happen that, on account of the backlash or lost motion in the registering train, no indication of such leakage will be given on the dial for a considerable period. Furthermore, the movement of the train is so slow that unless the leak is large, it is very difficult to detect it. It frequently happens, for these reasons, that the person installing the meter is compelled to wait a quarter of an hour, or longer, in order to determine, by observing the indicating dial, whether the pipes and fixtures are tight. Furthermore, it is very difficult for any one to detect small leaks in the fixtures or piping throughout the house, such as are very liable to occur at the stopcocks and joints. By my improvement, the fact as to whether there are any leaks at or beyond the meter can be readily detected, since the slightest flow of gas produces a perceptible indication within a very short time.

The following is a description of a meter embodying my invention, reference being had to the accompanying drawings, in which, Figure 1 is a side elevation of a meter embodying my improvement, one of the lower sections being opened by the removal of the front plate. Fig. 2 is a plan view of the meter with the top removed. Fig. 3 is a view of the case in section and showing certain parts within the case embodying my invention, in elevation. Fig. 4 is a detail.

Referring more particularly to the drawings, A is a meter casing having the usual front and back sections, each of which contains a disk B with the flexible diaphragm C and guide wires C'. Connected to each disk are posts D, to which is pivoted the flag E, rigidly secured by solder or otherwise to its flag wire F. The flag wires extend upward through stuffing boxes $f$, to the gallery of the meter. Connected to the flag wires are flag arms G—G', G being the upper arm and G' the forearm, in each instance. These arms G—G' are connected at H to the tangent I which forms a part of the crank-shaft J. The crank-shaft bears the worm K, which worm meshes with the gear L driving the index shaft M of the registering train N. The crank-shaft J passes into the valve chamber O, and operates the valves P located therein.

Q is a dog carried by the bridge and engaging the tangent so as to prevent backward rotation of the driving mechanism.

The parts thus far described are the parts of the standard meter, which has been in common use for many years. To a rapidly moving part of the driving mechanism of this meter I have connected an indicator preferably describing a circle having a diameter substantially equal to the depth of the meter casing. I preferably make the indicator in the form of a circle R, the connection being made by a cross-bar S, which is secured to the crank-shaft J by suitable means such as a screw T, so that the indicator moves in a horizontal plane. The cross-bar may be also secured rigidly to the crank-shaft or tangent I by any suitable securing means. This indicating circle R rotates behind a suitable opening U which for convenience I place above the indicating dial of the registering train so that a portion thereof is plainly visible through the casing. It is rigidly connected to the driving mechanism of the meter and, therefore, eliminates any danger of lost motion, so that any movement of the driving mechanism of the meter is at once communicated to the circle R. The driving mechanism of the meter always moves at a rate which is rapid relatively to the movement of the shaft M, or any portion of the registering train, the shaft J making fifteen revolutions to one revolution of the shaft M. The large radius of the indicating circle R causes a point on the periphery of that circle to move over a hundred times as fast as any portion of the registering train. Any movement of the operating mechanism is, therefore, easily and quickly detectable by observing the indicator R.

I have shown my quickly moving indicating surfaces R connected to the crank-shaft of the meter, and that is the form I prefer. In this form it should be concentric with the axis of the shaft J. It can, however, be connected to any suitable moving portion of the operating mechanism within the gallery, and although I prefer a direct connection, such direct connection is unnecessary if lost motion can be sufficiently eliminated and sufficient speed secured.

In the operation of my improvement, gas enters the inlet V and passes to the outlet W in the usual manner, causing the diaphragms to reciprocate and the flag wires and arms to oscillate, so as to turn the crank-shaft J. The slightest movement of this operating mechanism at once moves the graduated indicating circle R in a horizontal plane, and this movement is readily detectable through the opening U. By this means, as soon as the meter is connected and the gas is turned on, it can be at once ascertained whether there is any leakage on the outside of the meter, either in the coupling, or in the fixtures through the house. This ready means for detecting leakage at once enables any one to ascertain whether everything is in proper condition.

My invention permits of various modifications, such as might suggest themselves to those skilled in the art, but the form I have shown is simple and efficient and the form preferred by me.

What I claim is:

1. In a gas meter, the combination of a meter casing, a plurality of diaphragms, a plurality of flag wires, flags connected to said flag wires and actuated by said diaphragms, flag arms connected to said flag wires, a crank-shaft having a tangent connected to and driven by said flag arms, valves actuated by said crank shaft, a worm driven by said crank-shaft, a registering train driven by said worm, and an auxiliary indicator connected directly to said crank-shaft, said indicator describing a circle concentric with the axis of said crank-shaft, and being visible through said casing.

2. In a gas meter, the combination of a meter casing, a plurality of diaphragms, a plurality of flag wires, flags connected to said flag wires and actuated by said diaphragms, flag arms connected to said flag wires, a crank-shaft having a tangent connected to and driven by said flag arms, valves actuated by said crank-shaft, a worm driven by said crank-shaft, a registering train driven by said worm, and an auxiliary indicator connected directly to said crank-shaft and visible through said casing, said indicator describing a circle concentric with the axis of said crank-shaft, the diameter of said circle being substantially equal to the depth of the meter casing.

RICHARD L. DEZENDORF.

Witnesses:
H. B. BROWNELL,
ALICE MORFORD.